United States Patent [19]

Tsao

[11] Patent Number: 5,207,250

[45] Date of Patent: May 4, 1993

[54] POLLUTANT-PROOF CONTRACTIBLE CONTAINER

[76] Inventor: Ye-Ming Tsao, Rm No. 6-11, 6/F., No. 782 Ting Chou Rd., Taipei, Taiwan

[21] Appl. No.: 772,960

[22] Filed: Oct. 8, 1991

[51] Int. Cl.⁵ .......................................... B65B 47/00
[52] U.S. Cl. ..................................... 141/65; 141/18; 222/212; 222/143; 222/494; 222/666
[58] Field of Search ................ 215/1 C, 3; 220/666; 141/65, 18, 23, 24, 25, 26; 222/212, 213, 215, 143, 494–496

[56] References Cited

U.S. PATENT DOCUMENTS

| 3,244,332 | 4/1966 | Rogers | 222/213 |
| 3,390,821 | 7/1968 | Mullan | 222/212 |
| 3,456,650 | 7/1969 | Schwartzman | 222/212 |
| 3,768,705 | 10/1973 | Spatz | 222/212 X |
| 4,408,702 | 10/1983 | Horvath | 222/496 X |
| 4,506,809 | 3/1985 | Corsette | 222/213 |
| 4,785,978 | 11/1988 | Kano et al. | 222/496 X |
| 4,811,871 | 3/1989 | Wass et al. | 222/212 X |

FOREIGN PATENT DOCUMENTS

| 3807019 | 9/1989 | Fed. Rep. of Germany | 220/8 |
| 2578223 | 9/1986 | France | 215/1 C |

Primary Examiner—Ernest G. Cusick
Attorney, Agent, or Firm—Bacon & Thomas

[57] ABSTRACT

A container having a contractible body for storing a liquid is provided with a nonreturn valve in a neck outlet to permit dispensing of the liquid from the container while preventing external air or liquid from flowing into the container in order to preserve the freshness of any residual liquid. The collapsibility of the container provides indication of any residual liquid volume and plural empty containers may be joined together to minimize space occupancy and facilitating recycling.

4 Claims, 5 Drawing Sheets

POLLUTANT-PROOF CONTRACTIBLE CONTAINER

BACKGROUND OF THE INVENTION

The present invention relates to a pollutant-proof contractible container, particularly a container which can prevent air or liquids from entering into the container, and contract gradually as the volume of liquid decreases, so that the whole container can be folded for recycling convenience.

Generally, packages for beverages have been changed from breakable glass bottle to pop-top cans or PET bottles of today. As several disadvantages of glass bottles exist, e.g. carrying difficulties, high production costs, danger with broken pieces, they are being replaced by pop-top cans, foilpacks and PET bottles. However, the ring out of the pop-top cans may injure consumers, and the edge left by the ring rusts easily. Another drawback is that empty cans take too much space. As for PET bottles, the advantages of being light with a big capacity is offset by the difficulties of recycling post-treatments. This is a very important issue that we recycle the resources and transfer for further use. Another problem of PET bottles is that freshness is not easy to preserve because most people cannot always finish the large amount of drink in one container, thus permitting external air or liquid to enter into the container.

SUMMARY OF THE INVENTION

The main object of this invention is to provide a pollutant-proof contractible container on which a container neck is mounted, with a nonreturn value in the container neck that allows fluids to flow out easily but restrict entrance of foreign materials to prevent external air or contaminants from entering into the container in order to preserve the freshness of residual liquid.

Another object of this invention is to provide a pollutant-proof contractible container which can contract as the liquid volume decreases to facilitate visual inspection of residual liquid.

The third object of this invention is to provide a pollutant-proof contractible container which can be folded up and joined with other containers when liquid is used up to facilitate recycling and to minimize space occupance for recycling.

BRIEF DESCRIPTION OF THE DRAWINGS

The drawings depict an illustrative embodiment of the present invention which serves to exemplify the various advantages and objects thereof, and are as follows.

DETAILED DESCRIPTION OF THE PREFERRED EMBODIMENT

Figure 1:
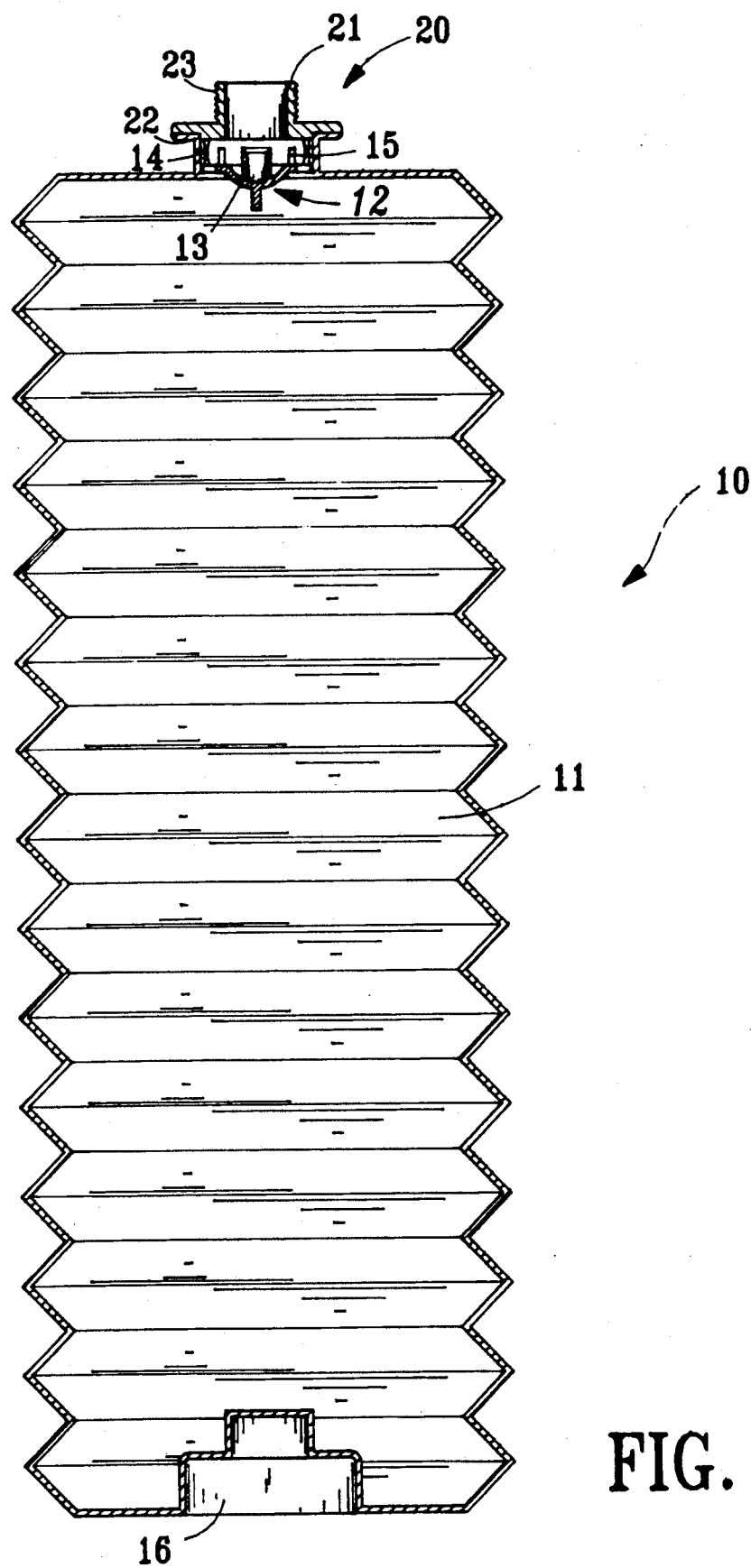
FIG. 1 is a front cross-sectional view of a pollutant-proof contractible container according to the present invention.
Figure 1A:
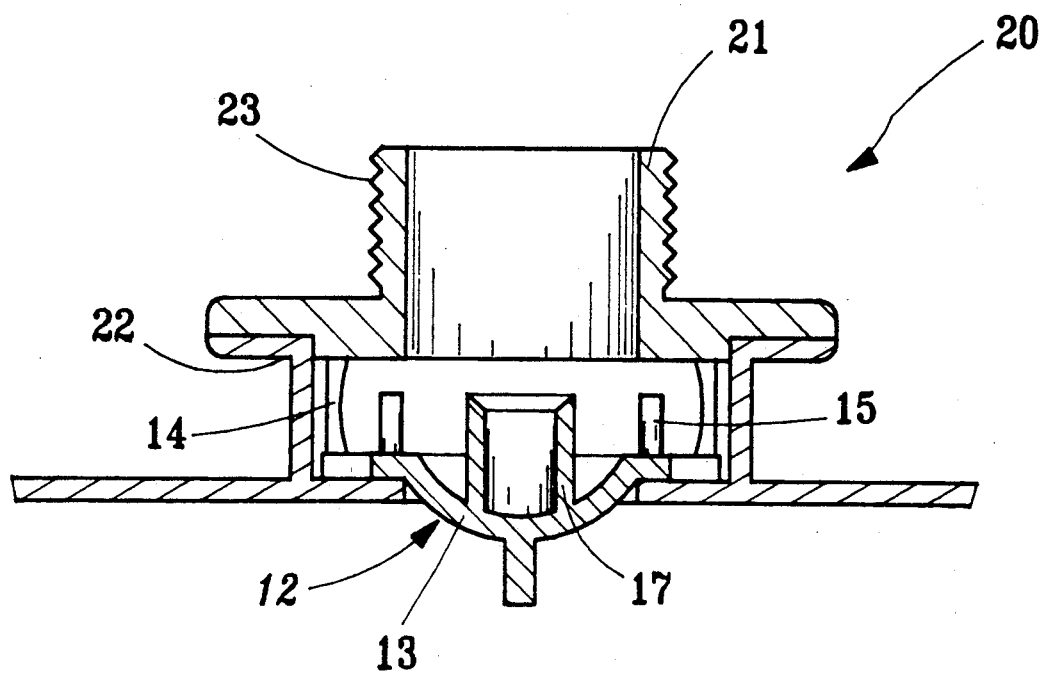
FIG. 1A is cross-sectional view of a nonreturn valve in a closed position according to the present invention.
Figure 1B:
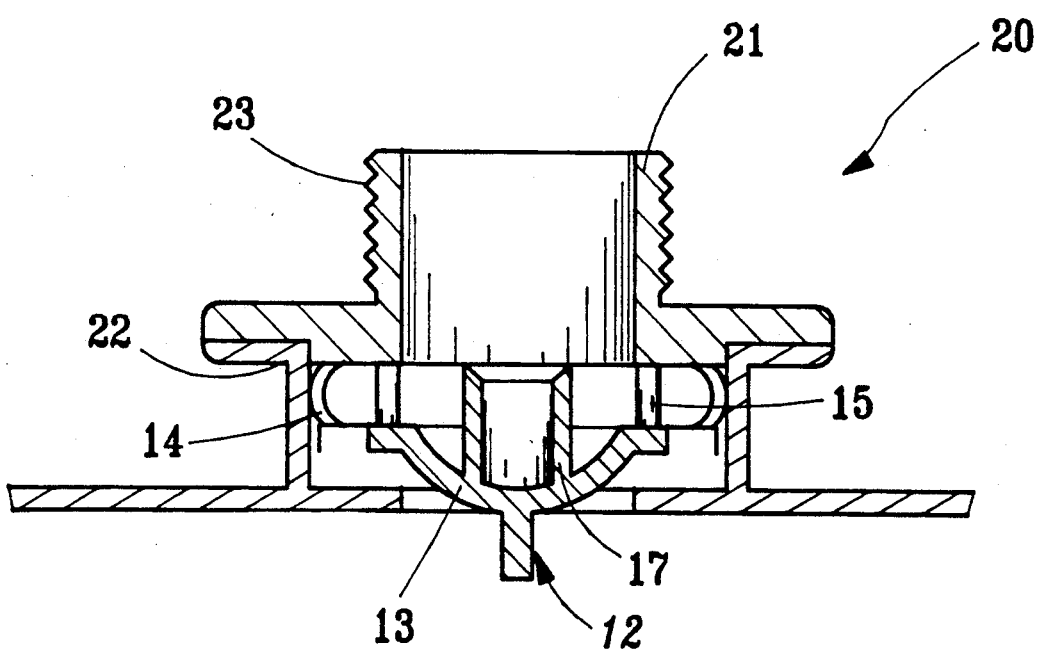
FIG. 1B is a cross-sectional view of the nonreturn valve in an open position according to the present invention.
Figure 2:
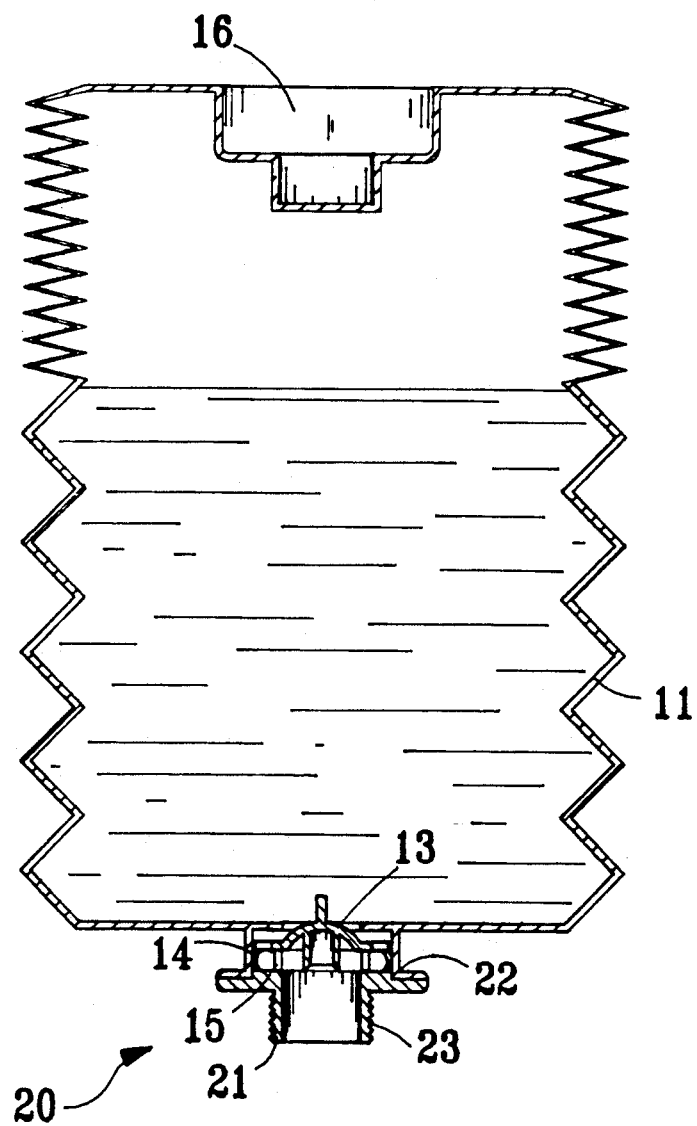
FIG. 2 is a cross-sectional view illustrating the pouring of liquid from the pollutant-proof contractible container according to the present invention.
Figure 3:
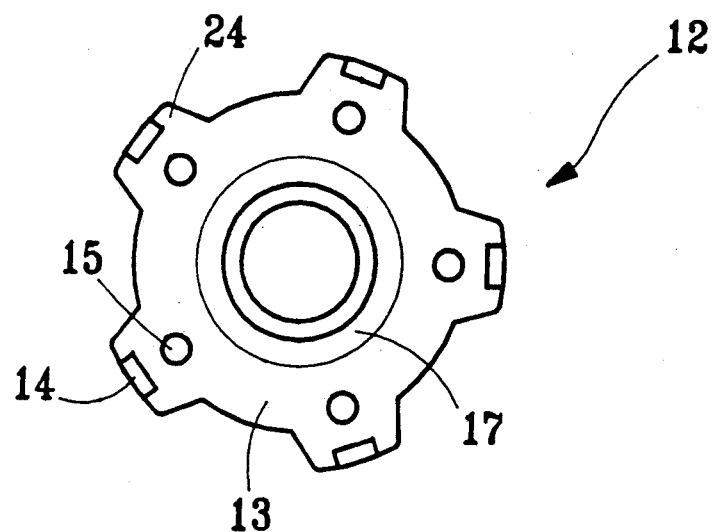
FIG. 3 is a top plan view of the nonreturn valve according to the present invention.
Figure 4:
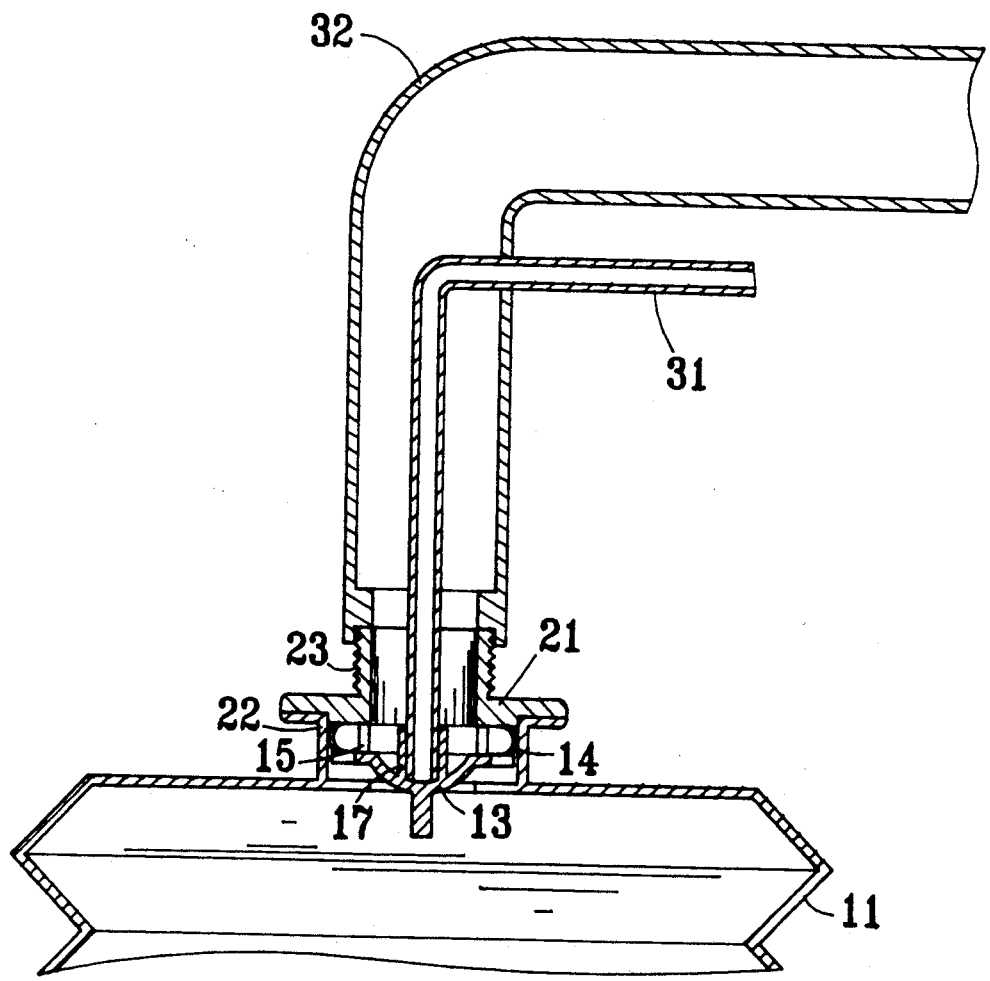
FIG. 4 is a cross-sectional view which illustrates the filling of liquids into the container according to the present invention.

Referring to attached drawings, the main purpose of the present invention is to provide a pollutant-proof contractible container (10) which comprises an annular contractible container (11) on which a container neck (20) is positioned, with a nonreturn valve (12) mounted inside the opening of the container neck (20) that allows fluid to flow out easily but renders it difficult to pour fluids therein. The container (20) is composed of an upper neck portion (21) and a lower neck portion (22), which are joined together by ultrasonic welding. The upper neck portion (21) has a thread on its external circumference. The bottom of the nonreturn valve (12) has a convex portion (13), around which there are some outwardly protruding flaps (24). A plurality of elastic plates (14) on the protruding flaps (24) are utilized to engage against the bottom of the upper neck (21), forcing the convex portion (13) to tightly press the edge of the outlet downwardly in the contractible container (11) and seal the outlet as well, whereby external air or liquids cannot enter the contractible container without specific tools. A plurality of fixed bars (15) are provided adjacent to the elastic plates (14) between the elastic plates (14) and the center of the nonreturn valve (12). They are mainly used to restrict the movement of the convex portion (13) during separation of the convex portion (13) from the outlet in the contractible container (11) by bending of the elastic plates (14) due to gravity or pressure exerted by liquid when the liquid is poured out of the container. At this moment a gap is produced between the convex portion (13) and the outlet in the contractible container (11), then the liquid flows out between the edges of the protruding flaps (24). Following the decrease of liquid in the container (11), the container (11) contracts. Thus, external air or liquids can not flow into the contractible container (11). So the remaining liquid in the container can easily be known according to the degree of contraction of the contractible container (11).

Figure 5:
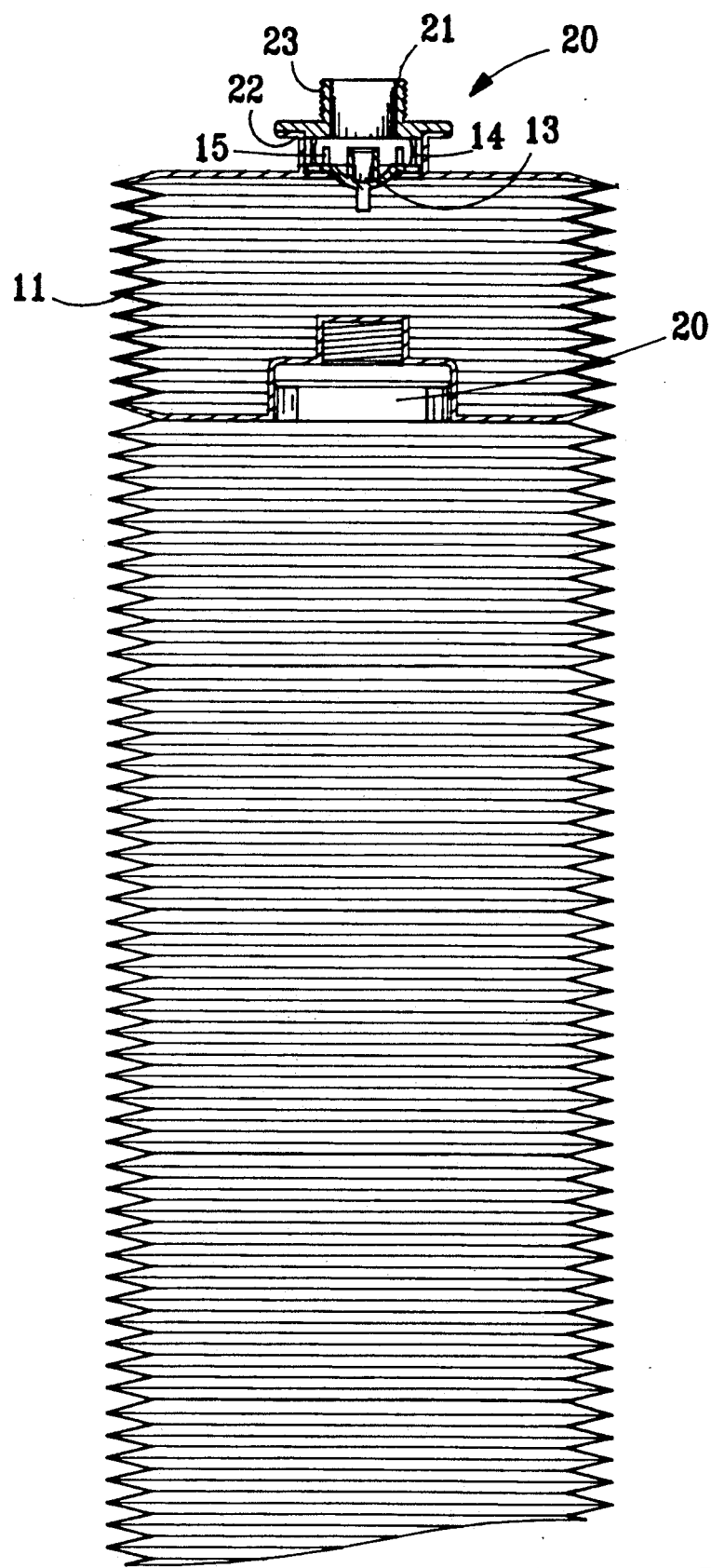
FIG. 5 illustrates the joining of plural contracted containers according to the present invention.

At the bottom of the contractible container (11) is a slot (16) large enough to contain the container neck (20) of another identical contractible container, so that emptied containers that have been contracted to its minimum volume can be joined together one by one to facilitate recycling, and to minimize space for recycling as shown in FIG. 5. On the central part of the nonreturn valve (12) there is a cylindrical sucker tube (17). For refilling of liquids, a filling tube (32) with a vacuum pumping tube (31) is fitted to the upper neck (21), by engaging the filling tube (32) to the threaded portion (23) while the vacuum pumping tube (31) is fitted to the cylindrical sucker tube (17) for suction. When suction is applied, the nonreturn valve (12) is pulled up and consequently opened with the fixed bars (15) holding out against the bottom of the upper neck (21), then liquids can flow into the contractible container (11) through the filling tube (32) without existence introducing air in the container (11). In this way, the freshness of the liquid can be preserved.

As indicated, the structure herein may be variously embodied. Recognizing various modifications will be apparent, the scope of the invention shall be deemed to be defined by the claims set forth below.

I claim:

1. A pollutant-proof container comprising:
   a) an annular contractible container body including a neck portion defining an outlet;
   b) a nonreturn valve disposed in the neck portion for closing and opening the outlet, the valve including a displaceable convex portion having a plurality of outwardly protruding flaps therearound, a plurality of elastic plates for urging the convex portion into sealing engagement against the outlet, a plurality of fixed bars for restricting the displacement of the convex portion when liquid is dispensed from the outlet, and a cylindrical sucker tube carried by the convex portion for engagement with a vacuum pump tube for removing air and opening the valve during filling of the container with liquid.

2. The container of claim 1 further including a slot formed in a bottom of the container body for engagement by the neck portion of another container to permit a plurality of collapsed containers to be secured together.

3. The container of claim 1 wherein the neck portion includes an upper neck portion and a lower neck portion joined together, and the elastic plates are positioned between the upper neck portion and the convex portion.

4. The container of claim 1 wherein the container is contractible to decrease its volume in response to the removal of liquid therefrom for permitting visual determination of the volume of any residual liquid.

* * * * *